Aug. 22, 1939.   R. A. LAMBERT   2,170,247
WATER TRAP FOR GASOLINE PIPE LINES, ETC., AND
FOR ALL STORAGE TANKS AND TANK CARS
Filed Nov. 30, 1937
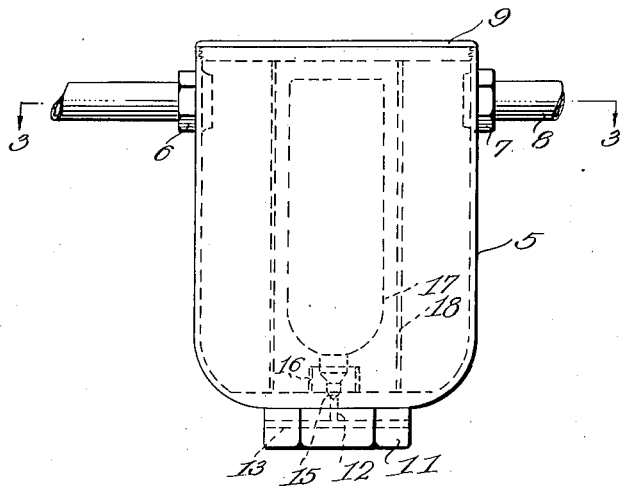
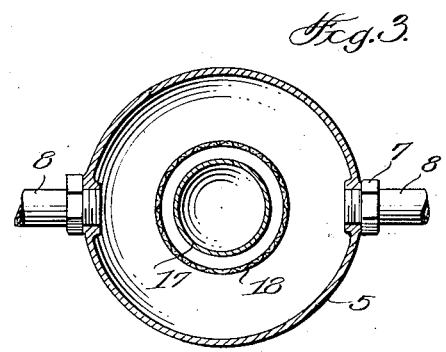
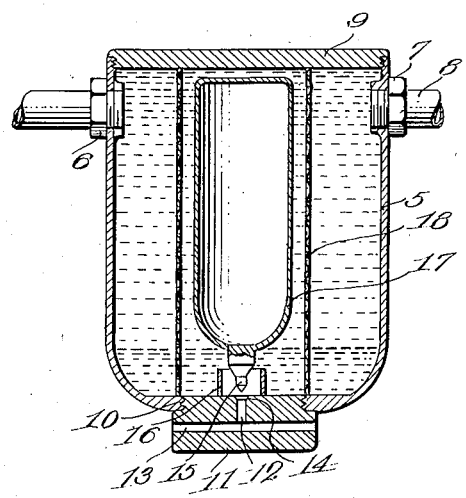
Richard A. Lambert
Inventor Patented Aug. 22, 1939

2,170,247

UNITED STATES PATENT OFFICE 2,170,247

WATER TRAP FOR GASOLINE PIPE LINES, ETC., AND FOR ALL STORAGE TANKS AND TANK CARS

Richard A. Lambert, Tacoma, Wash.

Application November 30, 1937, Serial No. 177,356

1 Claim. (Cl. 210—166)

This invention relates to improved water trap for gasoline pipe lines and has for its object to provide a trap for automatically removing water from gasoline flowing through a pipe line.

A further object of the invention is to provide a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation of the trap connected with a pipe line, Fig. 2 is a longitudinal sectional view of the same, and, Fig. 3 is a horizontal section taken on line 3—3 of Fig. 1.

In the drawing, wherein for the purpose of illustration, I have shown a preferred embodiment of my invention, the numeral 5 denotes a circular chamber having opposed ports 6 and 7 adjacent its upper end for connection with a pipe line 8, through which gasoline is adapted to flow. The upper end of the chamber is closed by a screw cap 9 and the bottom of the chamber is provided with a screw-threaded opening 10 for reception of the removable nut 11. The inner end of the nut is provided with a central passage 12 which communicates with the transverse passage 13 extending through the nut and opening through the sides thereof. The upper end of the passage 12 is provided with a valve seat 14 upon which the needle valve 15 is adapted to seat and surrounding the valve seat is an upstanding circular guide collar 16. The needle valve 15 is attached to the lower end of an elongated hollow metal or glass float 17 which is maintained in an upright position and guided in its movement by a cylindrical wire mesh tube 18 extending the length of the chamber. The float 17 has sufficient buoyance to be raised by water but insufficient buoyance to be raised by gasoline which is lighter than water.

In use, the gasoline flowing through the pipe line 8 passes into the chamber 5 where the water in the gasoline being heavier than the gasoline will sink to the bottom of the chamber. As the water rises in the bottom of the chamber it will elevate the float 17 which lifts the needle valve 15 from its seat 14 and allows the water to flow into the passage 12 and be discharged through the passage 13. As the level of the water in the chamber drops the float will be lowered and the needle valve seated thereby closing the passage 12. The screen tube 18 guides the movement of the float and also filters the water before it passes into the passage 12, so that no sediment will accumulate on the valve seat and interfere with the seating of the needle valve.

It is to be understood that the form of my invention herein shown and described is to be taken as a preferred example of the same and that certain changes in the shape, size and arrangement of the parts may be made without departing from the spirit of the invention or the scope of the subjoined claim.

Having thus described my invention, I claim:

A water trap for gasoline pipe lines comprising a chamber having opposed ports adjacent its upper end for connection with the pipe line and a threaded opening in the bottom thereof, a nut threaded in the bottom opening of said chamber having its inner end flush with the inside bottom of the chamber and its head disposed outside the bottom of the chamber, said nut having a transverse passage in its head opening through the sides thereof which communicates with a central vertical passage in the inner end of the nut communicating with said chamber, a valve seat at the upper end of the vertical passage in said nut, a guide collar surrounding said valve seat, a float disposed in said chamber, a screen tube surrounding said float and extending longitudinally of said chamber, and a needle valve attached to the lower end of said float adapted to engage with said valve seat when the float is lowered.

RICHARD A. LAMBERT.